(12) United States Patent
Robitaille

(10) Patent No.: US 10,484,291 B2
(45) Date of Patent: Nov. 19, 2019

(54) USING BANDWIDTH MEASUREMENTS TO ADJUST CIR AND EIR ON A SUB-RATE LINK

(71) Applicant: Accedian Networks Inc., Saint-Laurent (CA)

(72) Inventor: Claude Robitaille, St-Placide (CA)

(73) Assignee: Accedian Networks Inc., Saint Laurent (CA)

( * ) Notice: Subject to any disclaimer, the term of this patent is extended or adjusted under 35 U.S.C. 154(b) by 63 days.

(21) Appl. No.: 15/643,027

(22) Filed: Jul. 6, 2017

(65) Prior Publication Data

US 2017/0302583 A1    Oct. 19, 2017

Related U.S. Application Data

(63) Continuation of application No. 13/706,420, filed on Dec. 6, 2012, now abandoned.

(51) Int. Cl.
*H04L 12/841* (2013.01)
*H04L 12/26* (2006.01)
*H04L 12/815* (2013.01)

(52) U.S. Cl.
CPC .......... *H04L 47/283* (2013.01); *H04L 43/087* (2013.01); *H04L 43/0894* (2013.01); *H04L 47/22* (2013.01)

(58) Field of Classification Search
CPC . H04L 47/283; H04L 43/087; H04L 43/0894; H04L 47/22
See application file for complete search history.

(56) References Cited

U.S. PATENT DOCUMENTS 7,826,364 B1 * 11/2010 Krzanowski ........ H04L 12/5602
                                                      370/229
8,139,485 B2     3/2012 Arseneault
(Continued)

FOREIGN PATENT DOCUMENTS

WO        2009/034450        3/2009

OTHER PUBLICATIONS

On detecting service violations and bandwidth theft in QoS network domains, Ahsan Habib, et al., CERIAS and Department of Computer Sciences, Purdue University, Aug. 7, 2002 (11 pages).
(Continued)

*Primary Examiner* — Un C Cho
*Assistant Examiner* — Peter K Mak
(74) *Attorney, Agent, or Firm* — Stratford Managers Corporation

(57) ABSTRACT

A method and system are provided for measuring the bandwidth of a network segment between a first location and a second location by generating a plurality of synthetic packets at the first location and marking each generated synthetic packet with a transmission timestamp indicative of a first clock time at which the synthetic packet is generated; transmitting each of the generated synthetic packets to the second location; receiving each synthetic packet at the second location and marking each received synthetic packet with a reception timestamp indicative of a second clock time at which the synthetic packet is received at the second location; calculating an inter-packet delay variation of the network segment based on the transmission timestamp and the reception timestamp of two or more synthetic packets; and deriving an available bandwidth of the network segment based on the calculated inter-packet delay variation.

20 Claims, 7 Drawing Sheets

(56) References Cited

U.S. PATENT DOCUMENTS

| | | | |
|---|---|---|---|
| 2002/0085587 A1* | 7/2002 | Mascolo | H04L 43/0882 370/477 |
| 2006/0215574 A1* | 9/2006 | Padmanabhan | H04L 41/0896 370/252 |
| 2007/0081561 A1* | 4/2007 | Heninger | H04L 47/10 370/516 |
| 2007/0217448 A1* | 9/2007 | Luo | H04L 47/10 370/468 |
| 2008/0008095 A1 | 1/2008 | Gilfix | |
| 2008/0130494 A1 | 6/2008 | Kaluskar | |
| 2008/0212480 A1* | 9/2008 | Shimonishi | H04L 1/187 370/236 |
| 2009/0034596 A1 | 2/2009 | Chen et al. | |
| 2009/0103548 A1 | 4/2009 | Weiss | |
| 2010/0208588 A1* | 8/2010 | Vinokour | H04L 47/20 370/230.1 |
| 2011/0158101 A1 | 6/2011 | Figueira | |
| 2012/0281715 A1* | 11/2012 | Shojania | H04L 43/0882 370/468 |
| 2013/0100955 A1 | 4/2013 | Dunlap | |
| 2014/0112123 A1* | 4/2014 | Holness | H04L 12/437 370/222 |

OTHER PUBLICATIONS

Bradner, S. et al. "Benchmarking Methodlogy for Network Interconnect Devices." The Internet Society, Mar. 1999, XP015008327 (32 pages).

Stein, Y. "Y.ethoam—RFC2544 Features." International Telecommunication Union. vol. 5/13, Aug. 29, 2005 (3 pages).

Extended European Search Report dated Dec. 20, 2013 which issued in European Patent Application No. 13183169.5 (6 pages).

* cited by examiner

USING BANDWIDTH MEASUREMENTS TO ADJUST CIR AND EIR ON A SUB-RATE LINK

CROSS-REFERENCE TO RELATED APPLICATIONS

This application is a continuation and claims priority to U.S. patent application Ser. No. 13/706,420, filed Dec. 6, 2012 and entitled "Using Bandwidth Measurements to Adjust CIR and EIR on a Sub-rate Link", which is hereby incorporated by reference herein in its entirety.

FIELD OF THE INVENTION

This invention is directed towards the ability to react to a detected change in the available bandwidth of a sub-rate link, for instance wireless, by adjusting operating parameters for the link with regard to service assurance, traffic engineering, service reliability and related functions.

BACKGROUND OF THE INVENTION

Parameters and settings for service assurance, traffic engineering and service reliability (amongst a plurality of other network services), are often determined and defined based on the bandwidth of a link. This is the case for committed information rate (CIR) and excess information rate (EIR) settings of an Ethernet virtual circuit (EVC). Time synchronization protocols such as IEEE 1588v2 also require a link with a stable bandwidth in order to derive and maintain clock synchronization between a pair of networking devices. Flow control mechanisms have been used to adapt to the bandwidth of a link or network segment (ref: U.S. Pat. No. 8,139,485). Such flow control protocols require the knowledge of the protocol at each node in the segment.

By being able to detect and measure the available bandwidth of a link or network segment, it is possible to react to a change in the available bandwidth and adjust impacted parameters (for instance CIR and EIR) or adjust the clock synchronization between a pair of networking devices in order to attempt preserving the quality of the services offered over a link when its bandwidth is negatively impacted by spurious or permanent degradation, spurious degradation being sometimes common for wireless links suffering from temporary weather impairments and external sources of interference.

SUMMARY OF THE INVENTION

In accordance with one embodiment, a method and system are provided for measuring the bandwidth of a network segment between a first location and a second location by generating a plurality of synthetic packets at the first location and marking each generated synthetic packet with a transmission timestamp indicative of a first clock time at which the synthetic packet is generated; transmitting each of the generated synthetic packets to the second location; receiving each synthetic packet at the second location and marking each received synthetic packet with a reception timestamp indicative of a second clock time at which the synthetic packet is received at the second location; calculating an inter-packet delay variation of the network segment based on the transmission timestamp and the reception timestamp of two or more synthetic packets; and deriving an available bandwidth of the network segment based on the calculated inter-packet delay variation.

In one implementation, the derived available bandwidth is used to trigger one or more actions, such as the action of changing the configuration of traffic shapers for the network segment. The deriving of the available bandwidth preferably takes into account one or more previously calculated inter packet delay variations. The plurality of synthetic packets may have the same predetermined number of bytes, and may be transmitted substantially consecutively.

One implementation for calculating the inter packet delay variation comprises calculating a first delay as a difference between the reception timestamp and the transmission timestamp for a first of the plurality of synthetic packets; calculating a second delay for a second synthetic packet as a difference between the reception timestamp and the transmission timestamp for the second of the plurality of synthetic packets, and setting the inter packet delay variation as the difference between the second delay and the first delay. The available bandwidth of the network segment may be determined by multiplying a number of bytes in a first synthetic packet by the rate of a first link in the network segment and adding the calculated inter packet delay variation for the first synthetic packet, and dividing the resulting sum by a number of bytes in the synthetic packet.

BRIEF DESCRIPTION OF THE DRAWINGS

The invention may best be understood by reference to the following description taken in conjunction with the accompanying drawings.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
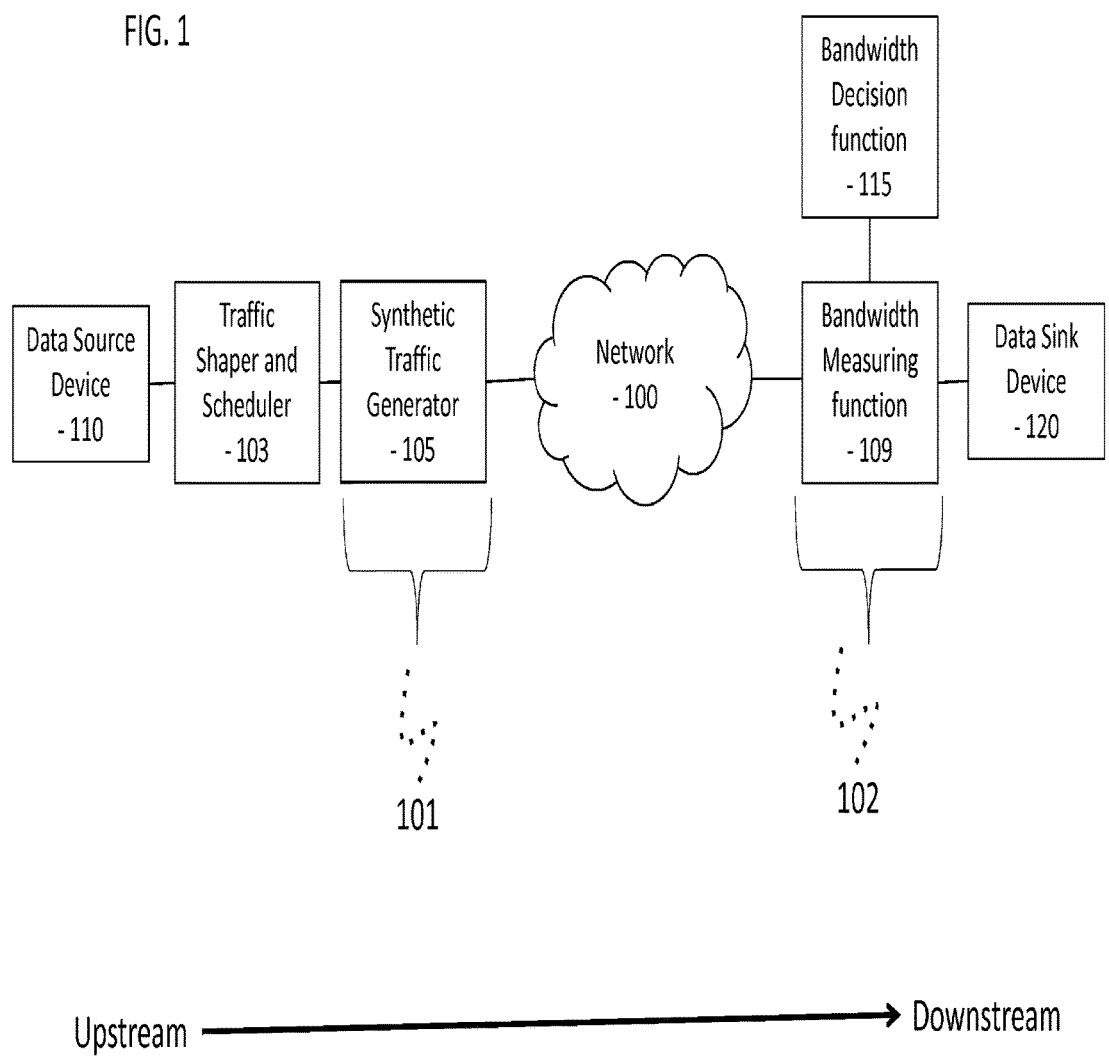
FIG. 1 illustrates a generic Ethernet network.

Turning now to the drawings and referring first to FIG. 1, the embodiment described herein allows measuring the available bandwidth in a network segment 104 between a first 101 and second 102 location in a network 100. The traffic is generated by a data source device 110 and received at a data sink device 120. Between devices 110 and 120, a Traffic Shaper and Scheduler (TSS) 103 function is implemented to shape the user traffic to be compliant to the configured CIR assigned to the connections from the source device 110. Furthermore, a Synthetic Traffic Generator (STG) 105 is implemented downstream and in the path of the traffic from the TSS 103 on the same side as the data source device 110 relative to the position of the network 100. The STG is implemented at the first location 101. Optionally, the TSS 103 and STG 105 can be combined at the first location 101. They could be, for example integrated as part of a Network Interface Device (NID) or an access switch. As another option, the TSS 103 and STG 105 can be integrated as part of the Data Source Device 110 and together forming the first location 101.

A bandwidth measurement function (BMF) 109 is implemented at a second location 102, on the opposite side relative to the position of the network 100 and upstream from the data sink device 120. At regular intervals, two or more synthetic packets (not user traffic) are generated by a STG 105 and transmitted at the highest possible rate and packet priority and without any substantial gap to the BMF 109 across the network 100 with the goal of obtaining measurement for the purpose of measuring the available bandwidth on the network 100 between the first location 101 and the second 102 location. After analysis by the BMF 109, the synthetic packets are discarded. In another embodiment, the BMF 109 is installed in parallel to the sink device 120 and is not in the direct data path between the network 100 and the sink device 120. The BMF can also be implemented a part of the sink device 120 or within a NID or other network elements.

An Inter Packet Delay Variation (IPDV) is calculated by the BMF 109 from the synthetic packets and is made available to a Bandwidth Decision Function (BDF) 115 that uses the IPDV to determine the available bandwidth of the network segment 104 between the first and second location. The packet is transmitted into the segment using a first link 106. The packet exits the segment using a second link 107. The BDF can be collocated with the BMF 109 at the second location, or the BDF 115 can be implemented at a separate location and used in a centralized manner, so multiple bandwidth measurements from different points in the network can be analyzed together.

The BDF 115 can trigger one or more actions based on the available bandwidth measured. For example, if a degradation or improvement of available bandwidth is estimated, an adjustment to the CIR and EIR settings for each class of service may be required. If an adjustment is needed to the settings (CIR and/or EIR) for one or more class of service for the network 100, the BDF 115 communicates the new settings to the TSS 103. In another embodiment, traffic belonging to one or more Class of Service (CoS) may be moved to a different network path with better performance.

Figure 2:
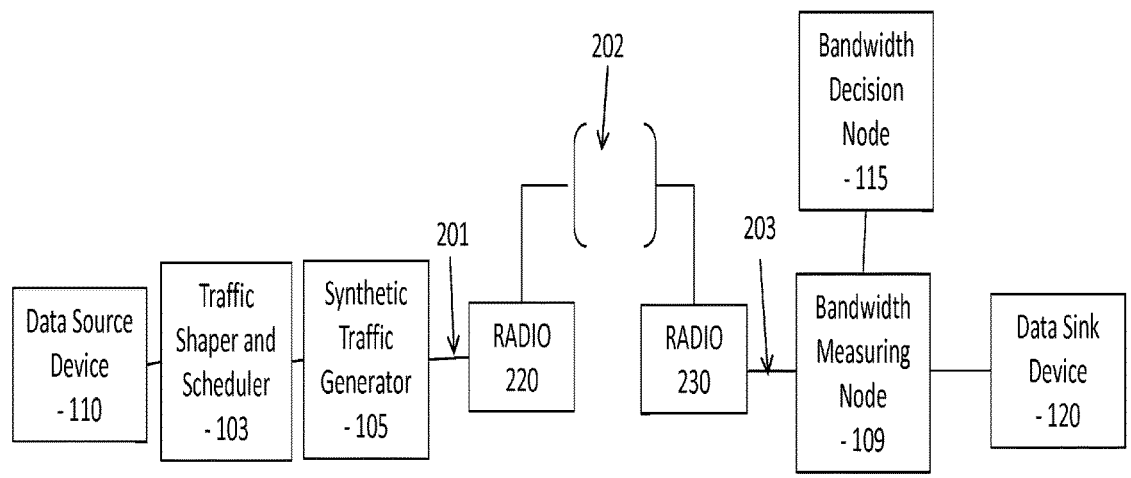
FIG. 2 illustrates an Ethernet network with a radio link.

FIG. 2 illustrates the case where the network segment is the radio link 202 created by a pair of radio transceivers (220, 230), in this case the first and second links are the same. In this case, measuring of the available bandwidth achieved by the pair of radio transceivers (220, 230) is important to detect any variance in the available bandwidth as the performance of the radio link may be negatively impacted by a number of external factors such as: a source of interference, weather conditions or modulation adjustments between the radio transceivers (220, 230). To obtain an estimate of the radio bandwidth, the first and second locations are implemented close to the radio transceivers. For the purpose of obtaining bandwidth measurements, the synthetic traffic from the STG 105 flows over link 201 to a first radio transceiver 220 where it may experience internal congestion before the synthetic packet is transmitted over link 202 toward a second radio transceiver 230 where the synthetic packet may further experience internal congestion before it is transmitted over link 203 to the BMF 109.

In another embodiment, the roles of STG 105 and of BMF 109 may be combined into the same device, and a pair of these combined devices would replace devices 105 and 109 in order to allow for the measuring of the bandwidth over link 202 in both directions (from link 201 to link 203 and from link 203 to link 201).

When the pair of radio transceivers (220, 230) supports data compression, the synthetic packets generated by the STG 105 may be constructed to prevent data compression in order to achieve more accurate IPDV measurements over the radio Link 202. If the synthetic packets are compressed over the radio Link 202, the content of each of the synthetic packets should ideally result in the same level of compression to limit any significant discrepancy in the IPDV measurements.

The IPDV is calculated by the BMF 109 and used by the BDF 115 to derive the available bandwidth of a link in a specific direction since links (especially radios, but also xDSL and others) may deliver asymmetric bandwidth for each direction of the link.

Figure 2A:
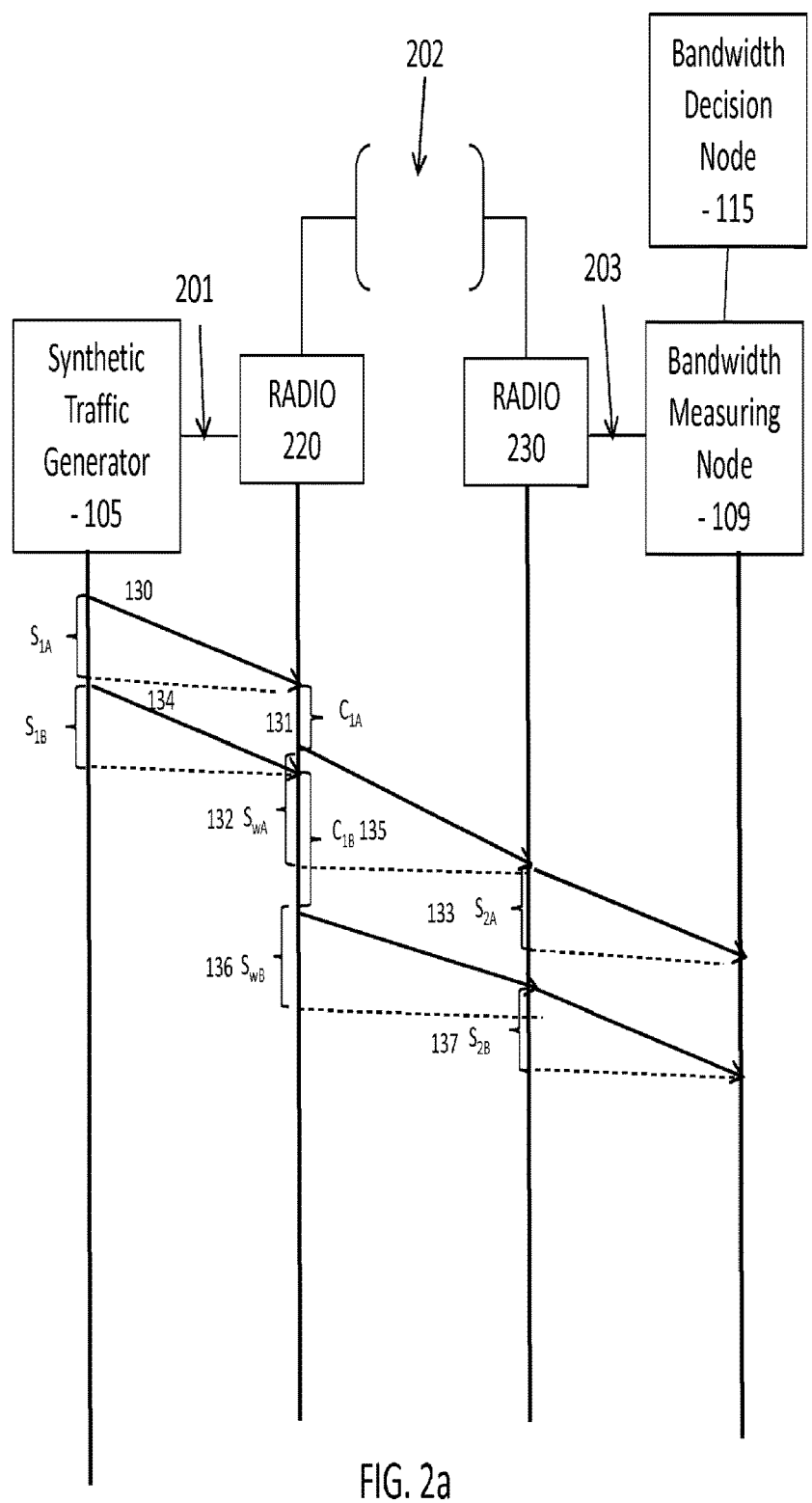
FIG. 2a illustrates measurement packets over a radio link of an Ethernet network.

FIG. 2A shows the variables used in an example IPDV measurement using two synthetic packets in the radio link example. Packet A and Packet B of Lengths $L_A$ and $L_B$, respectively.

Looking at FIG. 2 in more detail, synthetic packet A is generated by the STF 105 at time $T_0$ and received at the BMF 109 at time $RX_A$. The packet is marked with transmission timestamp $T_0$ and reception timestamp $RX_a$.

It is known that:

$$RX_A = T_0 + D_A$$

$$D_A = S_{1A} + C_{1A} + S_{WA} + S_{2A} + OFF$$

Where
$S_{1A}$=Serialisation delay 130 on link 1 (201)
$C_{1A}$=Congestion delay 131 in radio 220
$R_1$=Rate on link 1 (201)
$R_W$=Rate on wireless link 202
$S_{WA}$=Serialization delay 132 on wireless link 202
$S_{2A}$=Serialization delay 133 on link 2 (203)
OFF=Clock offset at bandwidth measuring node 109 when compared to the clock of the STG 105

Immediately after transmitting synthetic packet A, the STG 105 generates synthetic packet B at time $T_1$, and synthetic packet B is received at the BMF 109 at time $RX_B$.

It is known that:

$$RX_B = T_1 + D_B$$

$$D_B = S_{1B} + C_{1B} + S_{WB} + S_{2B} + OFF$$

Where
$S_{1B}$=Serialisation delay 134 on link 1 201
$C_{1B}$=Congestion delay 135 in radio 220=$C_{1A} + (L_A * R_W) - S_{1B}$
$R_W$=Rate on wireless link 202
$S_{WB}$=Serialization delay 136 on wireless link 202
$S_{2B}$=Serialization delay 137 on link 2 (203)
OFF=Clock offset at bandwidth measuring node 109 when compared to the clock of the STG 105
IPDV is computed as:

$$IPDV = (RX_B - T_1) - (RX_A - T_0) = D_B - D_A$$

Assuming $L_B = L_A$ $$IPDV = L_B * R_W - L_B * R_1$$

When using the IPDV measurements, the BDF 115 may use hysteresis or weighted average techniques to smooth the results to avoid reacting on transient variations. This is particularly useful for links that may experience periods of instability (such as radio links). IPDV measurements may also be considered as statistical outliers, and ignored or deleted, if they are significantly outside of the range of previous measurements.

The IPDV calculation (or average) can be used to estimate the bandwidth available between the first and second locations at any given moment using:

$$R_W = (IPDV + L_B R_1)/L_B$$

If the first and second locations are located near two radio transceivers, the bandwidth available $R_W$ represents the current bandwidth on the radio link.

The above calculation applies similarly to measure the available bandwidth of a network segment. In this case $R_W$ is the rate of the first link 106.

Figure 3:
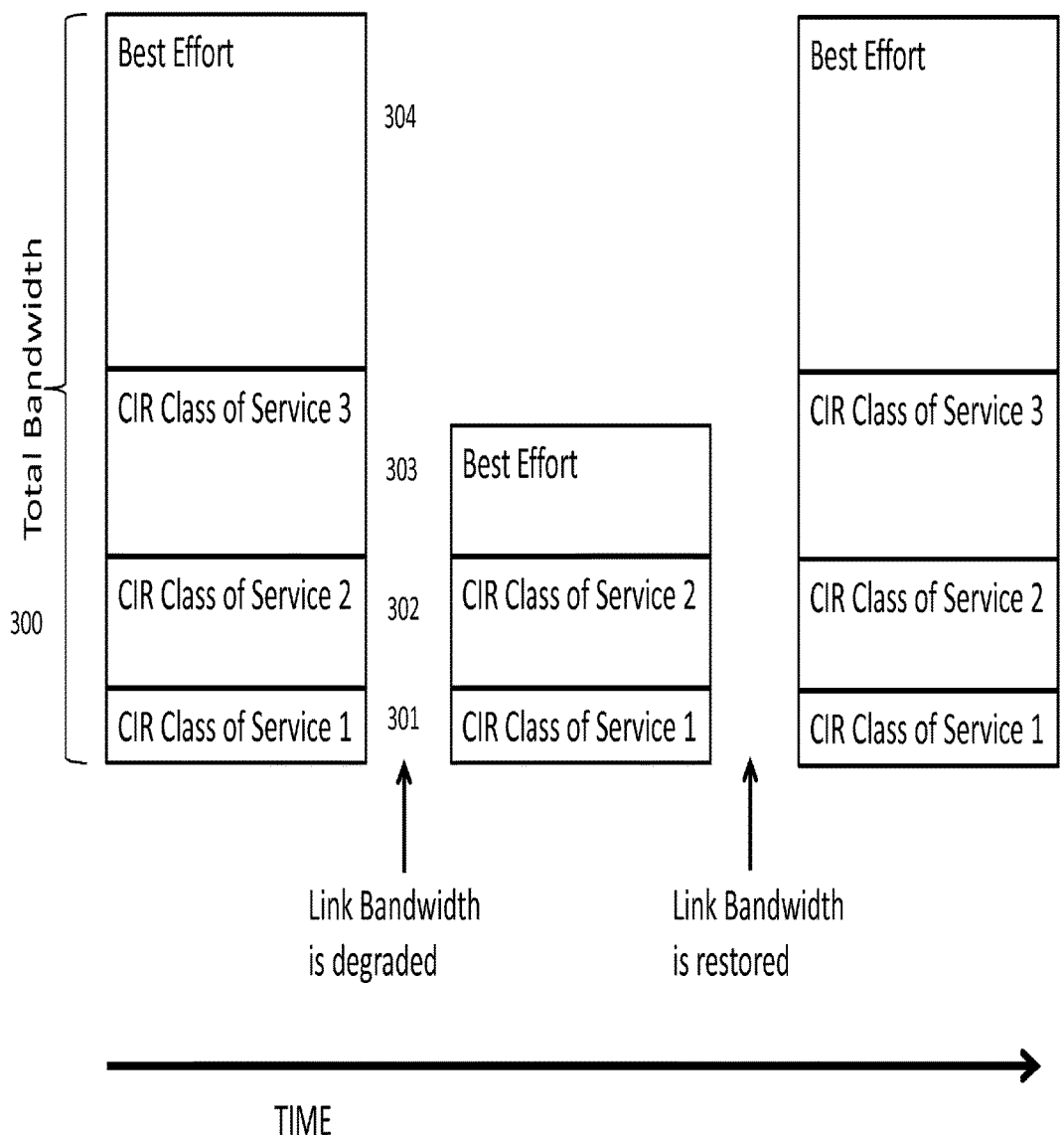
FIG. 3 illustrates how the CIR values for a plurality of classes of services evolve in reaction to changes in the total available bandwidth of a link.

Looking now at FIG. 3, the total available bandwidth 300 of a link 100 is divided amongst a plurality of classes of service with the corresponding CIR configured by the traffic shaper and scheduler 103. CIR 1 301 is associated with Class of Service 1, CIR 2 302 is associated with Class of Service 2, CIR 3 303 is associated with Class of Service 3 and the remaining bandwidth is associated with a best effort class of service 304. The shaping can be done for an aggregate of all connections sharing a class of service or implemented for each connection separately.

Over time, the link 100 may experience degradation in the total available bandwidth 300 it can deliver in the measured direction. In this case the BDF 115 takes action to reduce the CIR 3 303 to zero (effectively dropping all user traffic for that class of service). It can also take action to eliminate some or all of the best effort traffic 304. After another period of time, when the measurements indicate that the bandwidth available between the first and second locations is increased to a given level, the BDF 115 takes action to communicate with the TSS 103 and restore the value for CIR 3 303 to its originally defined value and the amount of remaining bandwidth 304 for best effort traffic is also restored to its originally defined value. In another embodiment, the BDF 115 reduces the CIR values (301, 302, 303, 304) for each class of service prorated to its original percentage of the total allocated bandwidth 300 and will reinstate the original CIR values (301, 302, 303, 304) for each class of service using the same prorated technique when more bandwidth becomes available on link 100.

The BDF 115 needs to keep track of the number of classes supported, applicable in the direction of the IPDV obtained for a link with the goal to avoid impacting the CIR of the higher priority classes of traffic when the overall performance of the link $R_W$ (in the measured direction) is degraded compared to the previous IPDV measurement.

The estimate of the $R_W$ measurement can be smoothed using different known techniques such as weighted averaging, moving averages etc. The smoothed estimate $SR_W$ can then be compared to different thresholds for the BDF to decide which action to take.

For example, if there are two classes of traffic defined over the link 100 and enforced by the TSS 103, the available bandwidth determined from the IPDV can be allocated in such a way that the CIR for the link corresponds to the CIR required to support the class with the highest priority of service, and with the second class configured to use the remaining bandwidth in a best-effort mode. This way, the CIR for the highest class of traffic is protected as long as the achievable bandwidth on the link 100 is sufficient to meet that CIR. When there are more than two classes of service, the CIR values for each class of service are adjusted (if needed), generally beginning with the CIR associated with the least priority class in order to minimize any impact to the higher classes of service.

Whenever the CIR for a class of service is modified, adequate notifications can be sent to a network management entity or a similar device to alert the network manager or the operator of the condition.

Furthermore, the BDF 115 can also take action to report any changes to the IPDV and resulting bandwidth and CIR settings to the network management entity, to allow full reporting of the changes. In order to avoid the generation of a large number of notifications, the BDF 115 may use well-known hysteresis techniques to limit the number of notifications while retaining the ability to report on drastic and rapid changes when a link is highly unstable.

Figure 4:
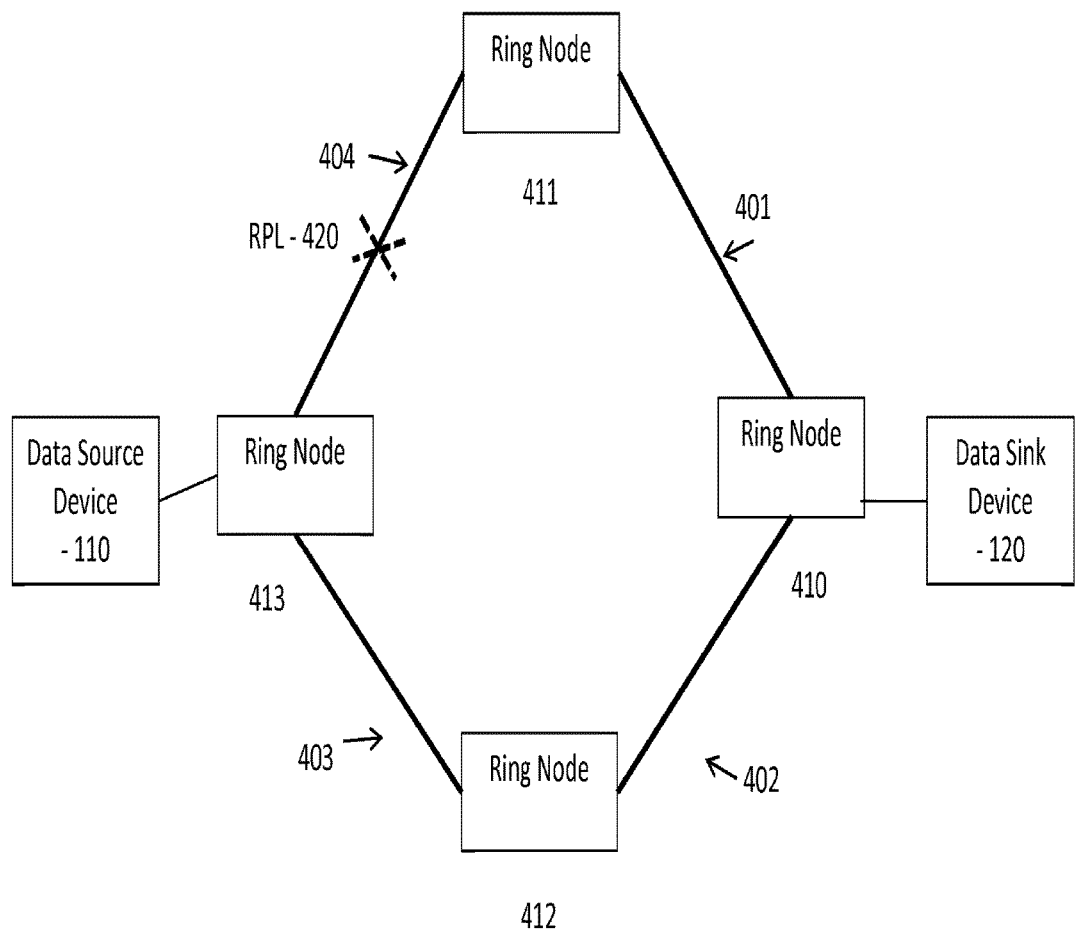
FIG. 4 illustrates a generic Ethernet network in a ring topology.

Networks are now generally designed with redundant links to recover from link failures. Looking at FIG. 4, a network consisting of individual links (401, 402, 403 and 404) installed between Ring nodes (410, 411, 412 and 413) is deployed in a ring topology to offer redundant data path in case one of the link (401, 402, 403 and 404) fails. As is well known in the art, the physical ring topology needs to be logically broken by disabling one of the links (401, 402, 403 and 404) where the disabled link (404 in FIG. 4) is known as the Ring Protection Link (RPL) 420. Traffic from a Data Source Device 110 flows toward a Data Sink Device 120 by transiting via ring node 413 toward ring node 412 over link 403 and then from ring node 412 to ring node 410 over link 402 before being extracted from the ring by ring node 410 and being passed to the Data Sink Device 120. Traffic in the opposite direction, from the Data Sink Device 120 to Data Source Device 110, transits from ring node 410 to ring node 412 over Link 402 and then from ring node 412 to ring node 413 over Link 403 and finally from ring node 413 to Data Source Device 110. In the advent of a failure of Ethernet Link 402 or 403, the RPL 420 will be moved to the failed Link (402 or 403), and any traffic between Data Source Device 110 and Data Sink Device 120 would flow over Links 401 and 404 and via ring nodes 410, 411 and 413.

Figure 5:
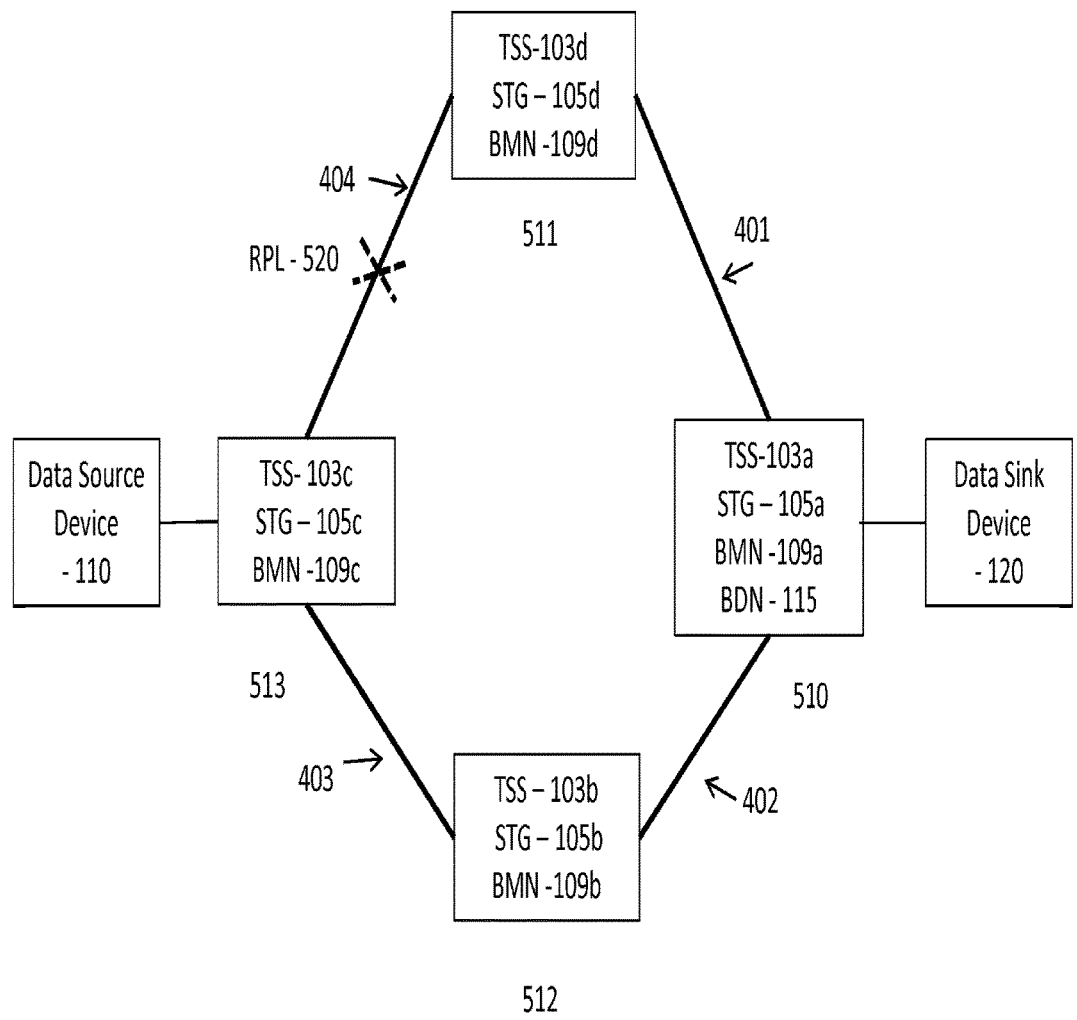
FIG. 5 illustrates an Ethernet network in a ring topology with bandwidth adjustments resulting from measurements taken at each node in the Ethernet ring.

Looking now at FIG. 5, each ring node (510, 511, 512 and 513) incorporates a TSS (103a, 103b, 103c and 103d), a STG (105a, 105b, 105c and 105d) and a BMF (109a, 109b, 109c and 109d). Furthermore, ring node 510 also incorporates a BDF 115 that centrally collects all of the IPDV measurements for each direction of each Ethernet Link (401, 402, 403 and 404) to maintain a global understanding of the total achievable bandwidth over the network 100. Rather than waiting for the total failure of a Link to reconfigure a Ring topology, it is desirable for the BDF 115 in ring node 510 to react to the degradation of the performance of a Link (401, 402, 403 or 404) by leveraging the IPDV measurements for each Link (401, 402, 403 and 404) and in each direction and adjusting the value of the CIR and EIR for each class of services for each Link (401, 402, 403 and 404) of the network 100 and enforced by the TSS (103a, 103b, 103c, 103d) of each ring node (510, 511, 512, 513). If the IPDV measurements indicate that the degradation of a Link (401, 402, 403 or 404) is beyond a predetermined threshold, the BDF 115 in ring node 510 effects one or more actions such as CIR adjustments to one or more links (401, 402, 403 and 404) to be implemented by the TSS (103a, 103b, 103c, 103d) by moving the RPL 520 to the degraded link, disabling the degraded link and enabling the use of the now available and fully functional link (404 in FIG. 5) to achieve the best possible overall performance on the network 100. For instance, the severe degradation or the total failure of link 402 results in the BDF 115 moving the location of the RPL 520 from link 404 to link 402. Upon restoration of the available bandwidth 300 of a link (401, 402, 403 and 404) to its original value (or to another value that is high enough), the BDF 115 may use the IPDV measurements (or the total available bandwidth 300) to determine where the RPL should be located, possibly reverting the RPL 520 to its original location over link 404.

In an alternate embodiment, the Bandwidth Decision Node 115 may be distributed among a plurality of ring nodes (510, 511, 512 and 513) rather than being integrated in a single centralized ring node (510 as per FIG. 5).

Figure 6:
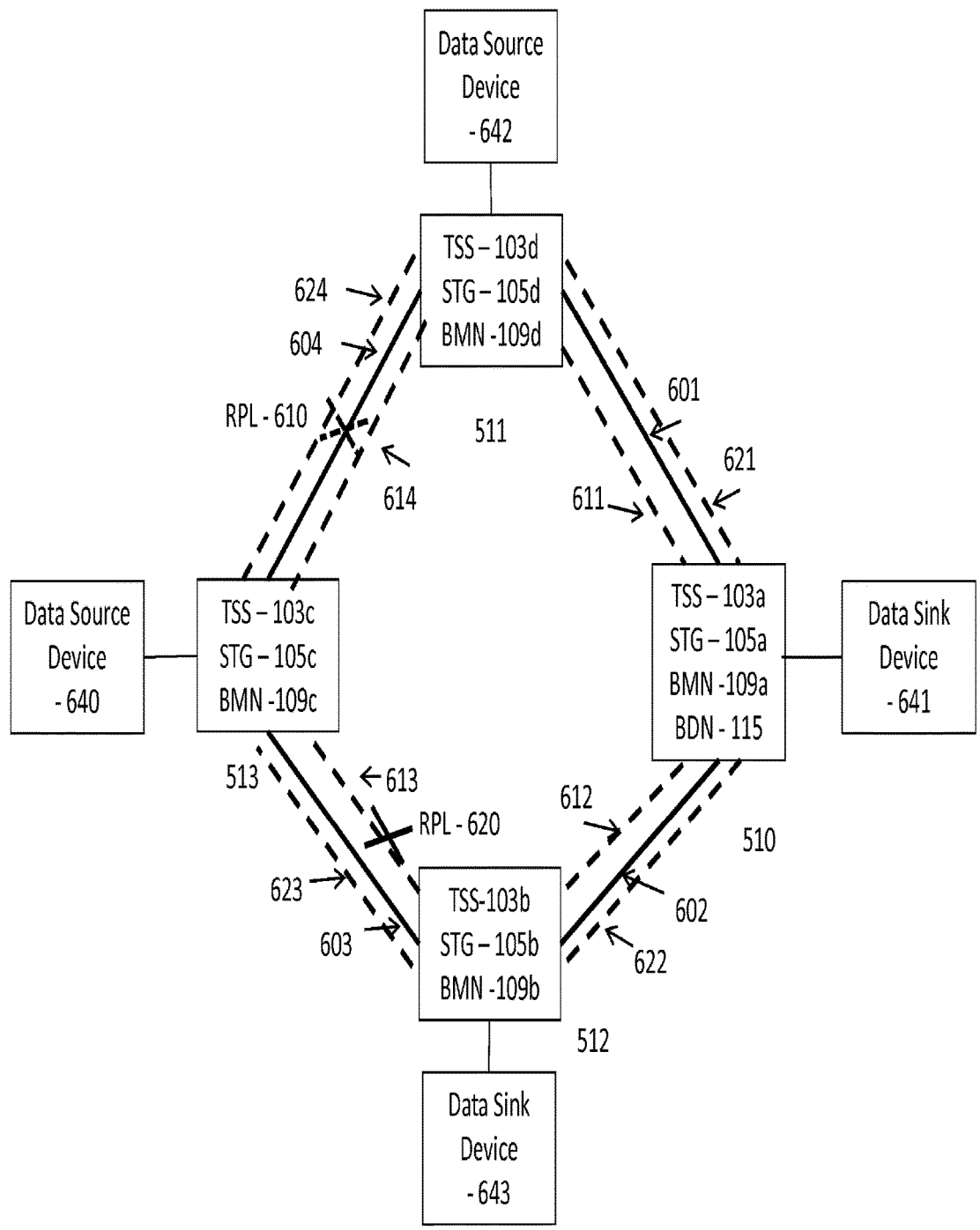
FIG. 6 illustrates an Ethernet network with a pair of rings with bandwidth adjustments resulting from measurements taken at each node in each of the pair of rings.

FIG. 6 illustrates a network 100 configured with a plurality of rings. The first ring consists of virtual Local Area Networks (VLANs) 611, 612, 613 and 614 with the RPL 610 assigned to Link 604 (VLAN 614). The second ring consists of virtual LANs 621, 622, 623 and 624 with the RPL 620 assigned to link 603 (VLAN 623). A dual-ring topology can serve various purposes, including supporting multiple Data Source Devices (640 and 642) and multiple Data Sink Devices (641 and 643) where each pair of devices (640 and 641, 642 and 643) is connected over a different ring. Using multiple rings may also be useful to support multiple BGP routers in a backhaul network where the traffic to the Internet is load balanced between the plurality of BGP routers to achieve higher bandwidth and to offer redundancy in case one of the BGP routers fails. Server redundancy and load balancing may also be achieved with a plurality of rings. Ring node 510 incorporates a centralized BDF 115 that is responsible for collecting and analysis of the IPDV measurements collected by each of the Ring nodes (510, 511, 512 and 513) in each direction of each link (601, 602, 603 and 604). The BDF 115 is also responsible to take action to trigger adjustments to the CIR and EIR values to be implemented by the TSS (103*a*, 103*b*, 103*c*, 103*d*) for each VLAN and for each class of service defined for VLANs 611, 612, 613 and 614 for the first ring and VLANs 621, 622, 623 and 624 for the second ring as well as the determination of where the RPL (610 and 620) should be set for each ring. The degradation of a link present on more than one ring (for example 601 and 602 in FIG. 6), may require adjustments to the CIR and EIR values for each class of service enforced by the TSS (103*a*, 103*b*, 103*c*, 103*d*) on each impacted ring and for other links feeding into or fed from a degraded link (601, 602, 603, 604).

When the IPDV measurements indicate the degradation of a single link (601, 602, 603, 604), the BDF 115 may take action to disable the degraded link and, optionally, locate both RPLs (610 and 620) on the same link (601, 602, 603, and 604) in order to achieve the best possible overall bandwidth.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A system in which bandwidth in both directions of a network segment is asymmetric, said system comprising:
   a synthetic traffic generator device, said synthetic traffic generator device configured to:
   generate a plurality of synthetic packets and mark each of said plurality of synthetic packets with a transmission timestamp indicative of a first clock time at which each synthetic packet is generated; and
   transmit each of said plurality of synthetic packets over said network;
   a bandwidth measurement function device configured to:
   measure said bandwidth in both directions of said network segment;
   receive said plurality of synthetic packets and mark each received synthetic packet with a reception timestamp indicative of a second clock time at which said each received synthetic packet is received;
   calculate an inter-packet delay variation by said bandwidth measurement function of said network segment based on said transmission timestamp and said reception timestamp of said generated plurality of synthetic packets;
   calculate an available bandwidth of said network segment based on said calculated inter-packet delay variation; and
   discard said generated plurality of synthetic packets after calculating said available bandwidth; and
   a traffic shaper and scheduler device in communication with said synthetic traffic generator device, said traffic shaper and scheduler device configured to allocate said available bandwidth between a plurality of classes of service to achieve a best overall available bandwidth in both directions of said network segment, wherein when said available bandwidth falls below a predetermined level, bandwidth allocated to a lowest priority class of service of said plurality of classes of service is reduced.

2. The system of claim 1, in which said bandwidth measurement function device is configured to derive said available bandwidth based at least in part on one or more previously calculated inter packet delay variations.

3. The system of claim 1, in which said synthetic traffic generator device is configured to generate each of said plurality of synthetic packets with the same number of bytes.

4. The system of claim 1, in which said synthetic traffic generator device is configured to transmit said plurality of synthetic packets substantially consecutively.

5. The system of claim 1, in which said bandwidth measurement function device is configured to:
   calculate said inter packet delay variation by calculating a first delay as a difference between said reception timestamp and said transmission timestamp for a first of said plurality of synthetic packets,
   calculate a second delay for a second synthetic packet as a difference between said reception timestamp and said transmission timestamp for a second of said plurality of synthetic packets, and
   set said inter packet delay variation as the difference between said second delay and said first delay.

6. The system of claim 1, in which said bandwidth measurement function device is configured to derive the available bandwidth of the network segment by
   multiplying a number of bytes in a first synthetic packet by the rate of a first link in said network segment and adding the calculated inter packet delay variation for said first synthetic packet, and
   dividing the resulting sum by a number of bytes in said first synthetic packet.

7. The system of claim 1, wherein said traffic shaper and scheduler allocates bandwidth not allocated to said plurality of classes of service to a best effort class of service.

8. The system of claim 7, wherein when said available bandwidth falls below a predetermined level said bandwidth allocated to said best effort class of service is reduced.

9. The system of claim 1, wherein said bandwidth allocated to said lowest priority class of service of said plurality of classes of service is reduced to zero.

10. The system of claim 1, wherein the network segment is disposed within a ring topology of an Ethernet network.

11. A system that adjusts committed information rate (CIR) and excess information rate (EIR) for classes of services in both directions of a network segment to achieve the best overall bandwidth of said link;
a synthetic traffic generator device configured to:
generate a plurality of synthetic packets and mark each of said plurality of synthetic packets with a transmission timestamp indicative of a first clock time at which each synthetic packet is generated, and;
transmit each of said plurality of synthetic packets over said network segment;
a bandwidth measurement function device configured to:
measure said bandwidth in both directions of said network segment;
receive said plurality of synthetic packets and mark each received synthetic packet with a reception timestamp indicative of a second clock time at which said each received synthetic packet is received;
calculate an inter-packet delay variation by said bandwidth measurement function of said network link based on said transmission timestamp and said reception timestamp of said generated plurality of synthetic packets;
calculate an available bandwidth of said network segment between based on said calculated inter-packet delay variation; and
discard said generated plurality of synthetic packets after calculating said available bandwidth; and
a traffic shaper and scheduler device in communication with said synthetic traffic generator device, said traffic shaper and scheduler device configured to allocate said available bandwidth between a plurality of classes of service by adjusting the CIR and EIR for each class of service to achieve a best overall available bandwidth of said network segment.

12. A method for managing an overall bandwidth of a network segment between a first location and a second location, said method comprising:
generating, by a synthetic traffic generator, a plurality of synthetic packets and marking each generated synthetic packet with a transmission timestamp indicative of a first clock time at which the synthetic packet is generated;
transmitting over said network segment, by said synthetic traffic generator device, each of the generated synthetic packets;
receiving, by a bandwidth measurement function device, each synthetic packet and marking each received synthetic packet with a reception timestamp indicative of a second clock time at which the synthetic packet is received;
calculating, by said bandwidth measurement function device, an inter-packet delay variation of said network segment based on said transmission timestamp and said reception timestamp of said generated plurality of synthetic packets;
deriving, by said bandwidth measurement function device, an available bandwidth of said network segment between said first and second locations based on said calculated inter-packet delay variation;
discard said generated plurality of synthetic packets after calculating said available bandwidth; and
allocating, by a traffic shaper and scheduler device, said available bandwidth between a plurality of classes of service by adjusting a CIR and EIR for each class of service to achieve a best overall available bandwidth in both directions of said network segment.

13. The method of claim 12, wherein the deriving of said available bandwidth takes into account one or more previously calculated inter packet delay variations.

14. The method of claim 12, wherein each of said plurality of synthetic packets has the same number of bytes.

15. The method of claim 12, wherein said plurality of synthetic packets are transmitted substantially consecutively.

16. The method of claim 12, in which said calculating said inter packet delay variation comprises:
calculating a first delay as a difference between said reception timestamp and said transmission timestamp for a first of said plurality of synthetic packets,
calculating a second delay for a second synthetic packet as a difference between said reception timestamp and said transmission timestamp for a second of said plurality of synthetic packets, and
setting said inter packet delay variation as the difference between said second delay and said first delay.

17. A method according to claim 12, in which said deriving an available bandwidth of the network segment comprises:
multiplying a number of bytes in a first synthetic packet by the rate of a first link in said network segment and adding the calculated inter packet delay variation for said first synthetic packet, and
dividing the resulting sum by a number of bytes in said first synthetic packet.

18. The method of claim 12, wherein said traffic shaper and scheduler allocates bandwidth not allocated to said plurality of classes of service to a best effort class of service.

19. The method of claim 18, wherein when said available bandwidth falls below a predetermined level said bandwidth allocated to said best effort class of service is reduced.

20. The method of claim 12, wherein said bandwidth allocated to said lowest priority class of service of said plurality of classes of service is reduced to zero.

* * * * *